March 22, 1932.        C. J. PETERSON        1,850,850
UNIFORM FLOW VALVE
Filed Aug. 3, 1928
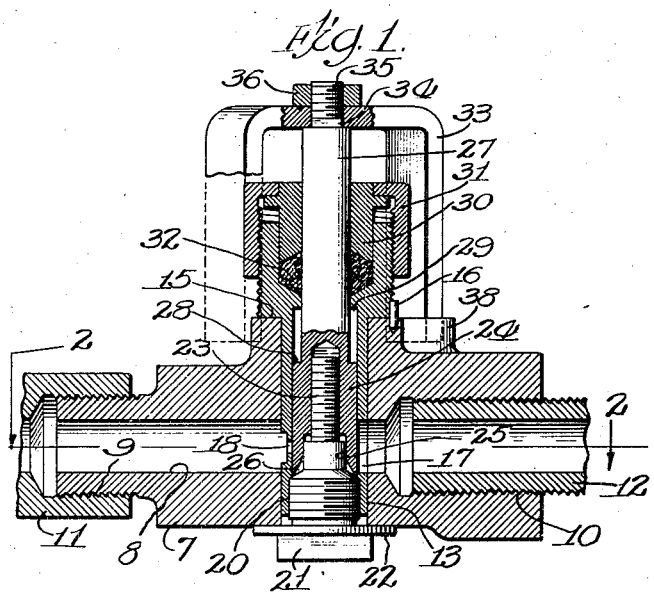
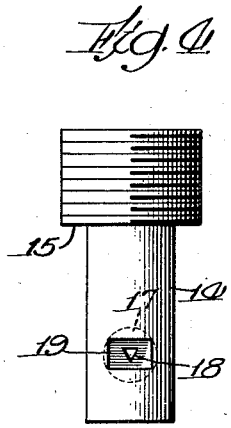
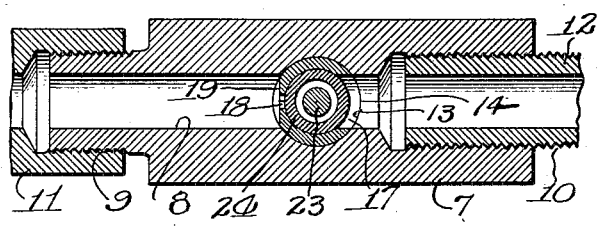
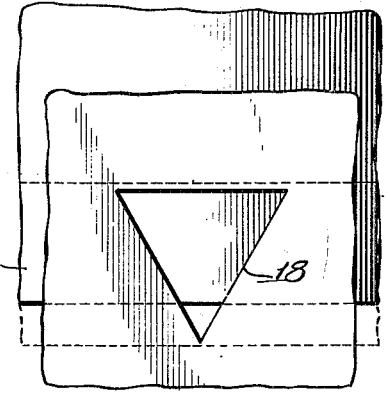
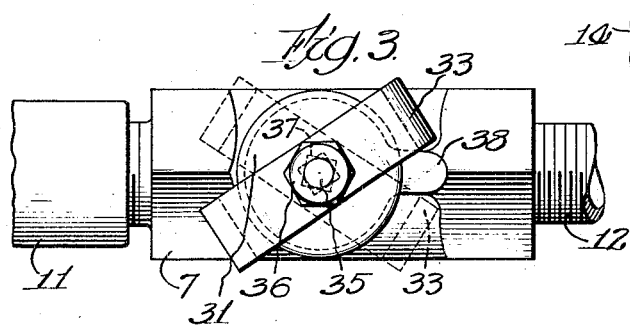
Inventor:
Christen J. Peterson,
By: Glenn S. Noble, Atty.

Patented Mar. 22, 1932

1,850,850

UNITED STATES PATENT OFFICE

CHRISTEN J. PETERSON, OF CHICAGO, ILLINOIS

UNIFORM FLOW VALVE

Application filed August 3, 1928. Serial No. 297,301.

This invention relates to valves which may be adapted for general purposes but which are particularly intended for use where accurate measurement or adjustment of the flow of the liquid is desired and is especially applicable for use for throttling or controlling small volumes. One example of such application is the control of liquid fuel for oil burners and the like. With such devices comparatively small quantities of liquid are used, and it has been found difficult to provide suitable valves for controlling the same. For instance, if an ordinary needle valve is used, it is likely to become clogged on account of impurities in the oil, and in such event the reduced flow to the burner may cause trouble in the furnace.

The present invention is designed to overcome the difficulties incident to the use of valves heretofore used for such purposes and to provide a valve which is adapted to maintain a uniform flow either for large or small volumes and one having a high volumetric efficiency for metering purposes.

The objects of this invention are to provide an improved valve which is adapted to provide a substantially uniform flow; to provide a valve which is adapted to control the flow of large or small quantities of oil or the like without becoming clogged; to provide a valve having a port or discharge of angular cross-section, the character of which remains the same for all flow positions of the valve; to provide a valve having a triangular port thru a thin wall or plate with means for regulating the size of the passageway while maintaining its triangular shape; to provide a valve having novel means for setting the same for limited control; to provide a valve having novel safety features; and to provide such other improvements in construction and advantages in operation as will appear more fully hereinafter.

In the accompanying drawings illustrating a commercial form of my invention,

Figure 1 is a longitudinal sectional view;

Figure 2 is a sectional view taken on the line 2—2 of Figure 1;

Figure 3 is a top plan view;

Figure 4 is a detail of the valve sleeve or port member;

Figure 5 is a diagrammatic view illustrating the nature of the valve control; and Figure 6 is a fragmentary detail of the handle.

The valve body 7 which may be of any standard or preferred form is provided with a longitudinal bore or passageway 8. This body may be provided with any suitable pipe connections, as for instance with threads 9 and 10 at either end thereof for engagement with the pipes 11 and 12. The valve body has a transverse hole 13 for receiving a tube or sleeve 14 which fits closely therein. This tube 14 is enlarged at its upper end and is provided with a shoulder 15 which engages with the upper surface of the valve body. A dowel pin 16 in the body engages in a recess in the enlarged portion to fix the position of the sleeve or cylinder 14 in the body.

The tube or cylinder 14 has a hole 17 in one side which is preferably round and coincides with the bore 8. On the opposite side of the tube is a hole 18 of angular cross section preferably being triangular with one side of the triangle arranged horizontally or transversely to the axis of the cylinder. In order to provide a thin plate or wall the tube 14 is preferably flattened, as shown at 19, with the hole substantially in the center of the flattened portion.

The tube 14 is threaded at its lower end, as shown at 20, for receiving a threaded plug 21, this plug having a flange 22 which fits closely against the bottom of the valve body and closes the end of the hole 13. When the plug is tightened the shoulder 15 is pressed against the upper end of the valve body, thereby making a tight closure throughout.

The plug 21 has a threaded stem 23 which engages in a threaded hole in a piston or cylinder valve proper 24 which fits closely in the tube 14 and coacts with the valve ports 17 and 18 for opening and closing the valve. The lower end of the valve 24 is recessed, as shown at 25, to fit over the enlarged portion of the plug 21, and it is tapered as shown at 26 to provide a sharp or substantially knife edge at the closure or cutting-off portion.

The valve or piston 24 has an integrally formed valve stem 27 of reduced diameter to provide a shoulder 28 which is adapted to engage with a shoulder 29 at the upper end of the tube or cylinder 14, the arrangement being such that the valve cannot be drawn outwardly through the upper end of the cylinder but must be inserted through the lower end, as shown in Figure 1. The enlarged upper end of the tube 14 is recessed to receive a packing gland 30 which is actuated by a packing nut 31 in the usual manner for compressing the packing 32 around the valve stem.

The stem 27 may be provided with any suitable handle but for the present purposes it is preferably provided with a U-shaped handle 33 which also serves as an adjustment limiting member. The upper end of the valve stem 27 is square or angular in cross section as shown at 34 and terminates in a threaded portion 35 for receiving a nut 36. The cross portion of the handle 33 has a hole 37 of angular cross section to engage with the angular portion 34 of the valve stem, this hole being shown in the form of an eight-pointed star so that the handle may be locked in a plurality of positions on the stem. The branches of the handle extend downwardly or toward the body and are adapted to engage at times with a stop lug or projection 38 on the valve body.

The underlying principle embodied in the principal feature of this invention will be readily understood from Figure 5 which shows the triangular port 18 in a thin plate or wall and a portion of the valve proper 14 on an enlarged scale. As the valve moves across the port, its cut off edge being parallel to the base of the triangle, always maintains a triangular opening from the full open position to the final closing position. On account of the angular shape of this hole and on account of its being in a thin plate or wall no particles or sediment are apt to collect in the hole or interfere with the passage of the liquid. Furthermore, the shearing action of the valve across the port tends to keep the valve passageway clean so that the flow will be uniform for any sized opening of the valve.

In the particular arrangement shown the valve is adjusted by turning the stem until approximately the proper opening is provided for instance to give approximately the proper amount of fuel for a burner. This is done with the handle removed or reversed so that it does not engage with the stop lug. When the adjustment is made the handle is then placed in position with the branches somewhat removed from the lug 38. With this arrangement the owner or operator may turn the handle through a predetermined movement and open and close the valve a limited amount, the arrangement being so that the owner cannot entirely cut off the supply or cannot open the valve too far so as to allow excessive flow to the burner while at the same time he may adjust the flow within suitable limits for the proper operation of the burner.

While these valves may be made in any desired size, the drawing is on an enlarged scale of the valves which I have made for use in connection with oil burners, these valves having equilateral orifices measuring approximately one-sixteenth of an inch on each side, this being sufficient to allow for the ordinary consumption. While the flow through the valves may be in either direction, the triangular orifice is preferably the outlet so that the valve proper tends to keep the inner side of the same clean at all times.

It will be apparent that other forms of valves may be utilized in conjunction with triangular or angular-shaped ports in order to utilize the advantageous features of this invention, and changes may be made in the form of the valve or in the arrangement of the parts without departing from the scope thereof as set forth in the following claims.

I claim:

1. The combination of a valve body having a longitudinal passageway therethrough and having a transverse hole, a sleeve fitting in said hole, said sleeve having ports in alignment with the passage, one of which is triangular in cross section, a cylindrical valve fitting in said sleeve, and means for moving the valve longitudinally as it is rotated to cause it to open and close said ports.

2. The combination of a valve body having a passageway therethrough, and having a transverse hole intersecting the passageway, a sleeve fitting in said hole and having an enlarged end engaging with the valve body, a plug engaging with the sleeve and valve body and having a threaded stem, a piston fitting in the sleeve and having a threaded hole engaging with the stem, said sleeve having ports which are opened and closed by the piston, a valve stem projecting from the piston, a packing for said stem, and means for turning the stem.

3. The combination with a valve body having a passageway therethrough and having a transverse hole intersecting the passageway, of a sleeve fitting in the hole and having ports registering with the passageway, one of said ports being of triangular cross section, said sleeve having a shouldered portion fitting against one side of the body, a threaded plug engaging with the sleeve and having a flange engaging with the body to hold the sleeve in position and to close the hole, a threaded stem on said plug, a piston valve having a threaded hole engaging with said stem, said valve being bevelled at its inner end to form an acute cut-off edge, a stem of less diameter than the valve projecting from the valve through a reduced hole in the sleeve, a packing for said stem, and a handle secured to the stem.

4. The combination with a valve having a rotatable valve stem, of a U-shaped handle, and a lug on the valve adapted to engage with the branches of the handle for limiting its turning movement.

5. A valve having a rotatable valve proper with a threaded hole in the end thereof, and a threaded stem arranged in fixed relation to the valve body and engaging in said threaded hole.

6. The combination with a valve body having a passageway therethrough, of a rotatable valve having a threaded hole therein, and a threaded member coacting with the valve for causing longitudinal movement thereof as the valve is rotated.

7. In a device of the character set forth, the combination of a valve body having a passageway therethrough, a screw arranged in fixed relation in the body, and a rotatable valve for controlling said passageway having a threaded hole engaging with said screw.

8. A valve construction having a port of angular cross section, a valve coacting therewith and having a threaded opening in the end thereof and a threaded member engaging in said opening for moving the valve longitudinally when the valve is rotated.

CHRISTEN J. PETERSON.